United States Patent [19]
Nakai et al.

[11] Patent Number: 4,636,253
[45] Date of Patent: Jan. 13, 1987

[54] DIAMOND SINTERED BODY FOR TOOLS AND METHOD OF MANUFACTURING SAME

[75] Inventors: Tetsuo Nakai; Shuji Yazu, both of Itami, Japan

[73] Assignee: Sumitomo Electric Industries, Ltd., Osaka, Japan

[21] Appl. No.: 769,609

[22] Filed: Aug. 26, 1985

[30] Foreign Application Priority Data

Sep. 8, 1984 [JP] Japan ............................ 59-188492
Oct. 26, 1984 [JP] Japan ............................ 59-226574
Nov. 21, 1984 [JP] Japan ............................ 59-246565

[51] Int. Cl.$^4$ .................................................. C22C 29/02
[52] U.S. Cl. .................................... 75/239; 75/240; 75/242; 75/243; 419/11; 419/12; 419/14; 419/15; 419/17; 419/18; 419/23; 419/26; 419/31; 419/35
[58] Field of Search .................. 75/236, 237, 238, 239, 75/240, 243, 242; 419/10, 11, 12, 14–18, 23, 26, 31, 32, 35, 38, 39

[56] References Cited

U.S. PATENT DOCUMENTS

| | | | |
|---|---|---|---|
| 3,745,623 | 7/1973 | Wentorf, Jr. et al. | 29/95 B |
| 4,224,380 | 9/1980 | Bovenkerk et al. | 428/545 |
| 4,288,248 | 9/1981 | Bovenkerk et al. | 75/226 |
| 4,303,442 | 12/1981 | Haka et al. | 75/243 |
| 4,403,015 | 9/1983 | Nakai et al. | 428/565 |
| 4,442,180 | 4/1984 | Haka et al. | 75/244 |
| 4,505,746 | 3/1985 | Nakai et al. | 75/238 |
| 4,518,659 | 5/1985 | Gigl et al. | 75/243 |

FOREIGN PATENT DOCUMENTS

53-136790 11/1978 Japan.
59-35066 2/1984 Japan.

*Primary Examiner*—Stephen J. Lechert, Jr.
*Attorney, Agent, or Firm*—Staas & Halsey

[57] ABSTRACT

A diamond sintered body for tools contains a diamond content in excess of 93 percent and not more than 99 percent by volume and a residue including at least one of a metal or a carbide selected from groups IVa, Va and VIa of the periodic table and an iron group metal of 0.1 to 3 percent by volume in total and pores at least 0.5 percent and not more than 7 percent by volume.

33 Claims, 4 Drawing Figures

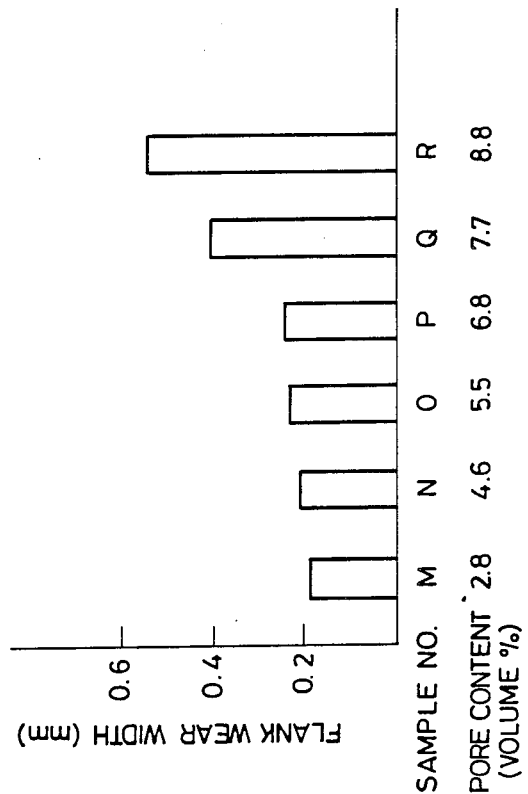

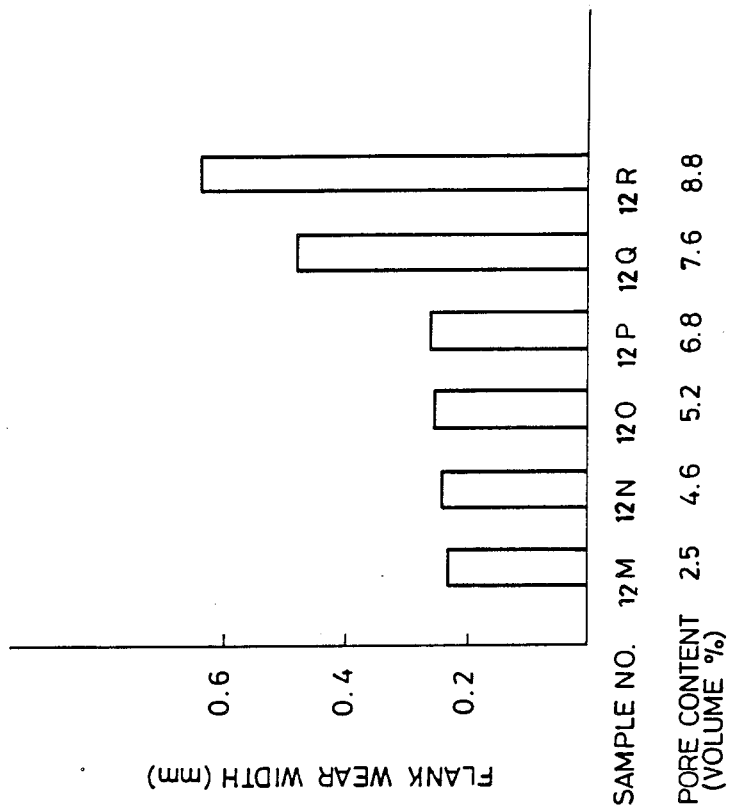

DIAMOND SINTERED BODY FOR TOOLS AND METHOD OF MANUFACTURING SAME

BACKGROUND OF THE INVENTION

1. Field of Invention

The present invention relates to a diamond sintered body which is applied to various tools such as a cutting tool, a drill bit and a wiredrawing die, and a method of manufacturing the same.

2. Description of the Prior Art

Now on the market is a sintered body for tools containing a diamond content in excess of 70 percent by volume in which diamond particles are bonded to each other. Such a sintered body is employed for cutting nonferrous metals, plastics or ceramics, or is applied to dressers, drill bits or wiredrawing dies. The diamond sintered body is remarkably excellent in efficiency particularly when the same is employed in cutting of non-ferrous metals or is applied to wiredrawing dies of relatively soft wire rods such as copper wires.

Such diamond sintered bodies are provided in various structures and shapes depending on the application thereof, and the cutting tools, dressers and rock drilling bits are generally formed by those in which layers of diamond sintered bodies are bonded to highly tough base metals such as cemented carbide.

Known as examples of compound sintered compacts in the aforementioned structure are a compound sintered compact disclosed in U.S. Pat. No. 3745623 in which a layer of a diamond sintered body is directly bonded to a base material of WC-base cemented carbide, and that disclosed in U.S. Pat. No. 4403015 in which a layer of a diamond sintered body is bonded to a base material of cemented carbide etc. through an intermediate bonding layer.

In the diamond sintered body layer of the aforementioned compound sintered compact now in use, an iron group metal such as cobalt is generally employed as a binder for diamond particles. The iron group metal is utilized as a catalyst for synthesizing diamond from graphite, and is considered to partially dissolve the diamond powder in sintering under a superhigh pressure, thereby to securely sinter the layer of the diamond particles.

The iron group metal may be mixed with the diamond powder before sintering, and also known in the art is a method of infiltrating a solution of the base material of WC-Co in the diamond powder in sintering, as disclosed in U.S. Pat. No. 3745623. Such a diamond sintered body is excellent in abrasion resistance and strength, and highly efficient in the uses for which single-crystal diamond has generally been employed, whereas the same is greatly restricted with respect to heat resistance. Diamond is graphitized from its surface at a temperature of about 900° C. and over in the atmosphere, while such graphitization is hardly caused in a vacuum or an inert gas even if the temperature is about 1400° C. However, when the aforementioned general diamond sintered body is heated, efficiency of the tool is deteriorated at a temperature of about 750° C. This means that the efficiency is naturally lowered under such a condition of use that the tool (e.g., a cutting tool or drilling bit) is used under a high temperature. The conventional diamond sintered body may be deteriorated at a temperature lower than that in the case of single-crystal diamond, for the reason that the diamond is largely different in thermal expansion coefficient from the iron group metal binder and the thermal stress in the sintered body is increased by heating whereby the texture is broken, and for the reason that the iron group metal facilitates graphitization of the diamond.

In order to improve heat resistance of the diamond sintered body, proposed is a method of preparing a sintered body which is not bonded to a base material such as cemented carbide and dipping the same in aqua regia or the like to be heated, thereby to leach the metallic bond phase in the sintered body, as disclosed in U.S. Pat. No. 4224380. It is considered that heat resistance of the diamond sintered body is improved to stand heating up to 1200° C.

In the diamond sintered body disclosed in U.S. Pat. No. 4224380, about 5~30 percent by volume of pores are defined since the metallic bond phase is leached by acid treatment. Thus, the strength of the sintered body is so greatly lowered that the same is not sufficient in toughness for use as a tool. Further the method disclosed in the prior art, the sintered diamond body is not satisfactory for application to a drilling bit.

The inventors have already proposed a diamond sintered body which is excellent in strength, abrasion resistance and heat resistance as disclosed in Japanese Patent Laying-open Gazette No. 35066/1984. The sintered body disclosed therein is obtained by employing a carbide selected from groups IVa, Va and VIa of the periodic table as the binder to substantially decrease the content of pores, thereby to prevent lowering of strength of the sintered body caused by leaching of cobalt.

However, it has been recognized that although the diamond sintered body disclosed in Japanese Patent Laying-open Gazette No. 35066/1984 is reliably prevented from lowering of strength, the same is deteriorated by the difference in thermal expansion between the carbide and the diamond material under a high temperature over 1000° C. Thus, the diamond sintered body is not yet satisfactory for application to a tool whose edge is exposed to a high temperature, such as that employed in geothermal well drilling.

SUMMARY OF THE INVENTION

Accordingly, an object of the present invention is to provide a diamond sintered body for tools which is further excellent in heat resistance, strength and abrasion resistance.

Provided according to a broad aspect of the present invention is a diamond sintered body which contains a diamond content in excess of 93 percent and not more than 99 percent by volume, and a residue including 0.1 to 3 percent by volume of a metal or a carbide selected from groups IVa, Va and VIa of the periodic table and/or an iron group metal and pores at least 0.5 percent and not more than 7 percent by volume, or further including 0.005 to 0.25 percent by volume of boron and/or a boride.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustration showing the results of excavation of andesite by heat-resistant diamond sintered bodies obtained by Example 4; and FIG. 4 is an illustration showing the results of excavation of andesite by heat-resistant diamond sintered bodies obtained by Example 12.

DESCRIPTION OF THE PREFERRED EMBODIMENTS

The inventors have studied deeply to obtain a diamond sintered body which is further excellent in heat resistance, and found that heat resistance is further improved with excellent abrasion resistance and strength in a diamond sintered body which contains a diamond content in excess of 93 percent and not more than 99 percent by volume and a residue including 0.1 to 3 percent by volume of a metal or a carbide selected from groups IVa, Va and VIa of the periodic table and/or an iron group metal and pores at least 0.5 percent and not more than 7 percent by volume, or further including 0.005 to 0.25 percent by volume of boron and/or a boride.

Figure 1:
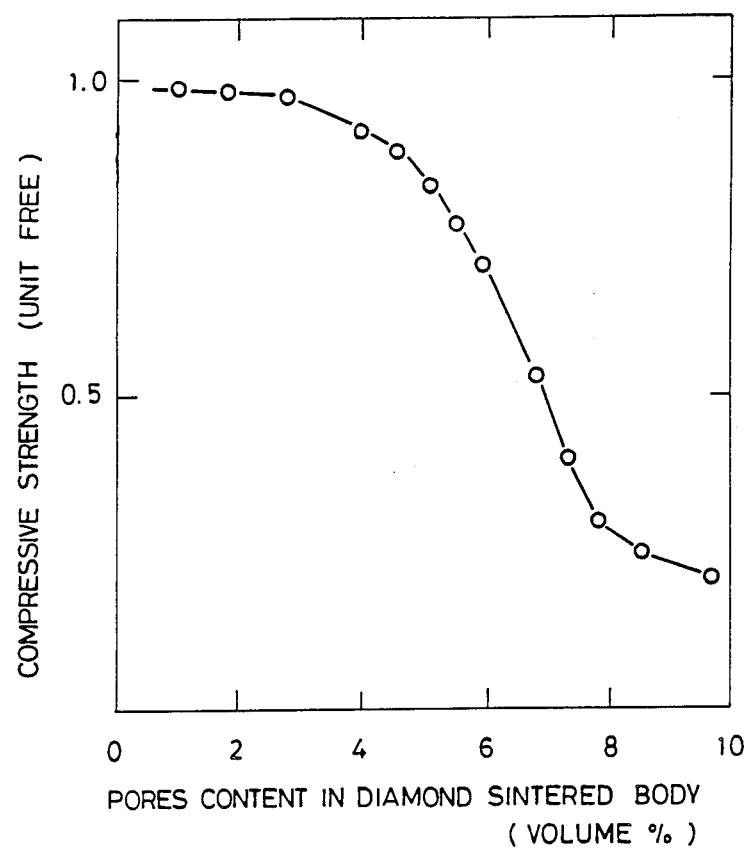
FIG. 1 is an illustration showing the relationship between compression strength and volume of pores in a heat-resistant diamond sintered body from which a bonding phase is leached.

As hereinabove described, the iron group metal employed as the binder may be removed to improve heat resistance of the diamond sintered body. However, as a result, pores are defined by removal of the binder. The relationship between strength of a diamond sintered body and the pores thus defined is as shown in FIG. 1. Namely, strength of the diamond sintered body is reduced as the content of the pores is increased, the reduction beginning with the content of pores exceeding 3 percent with steep lowering with the content within a range of 4.5 to 8 percent and reduction in the rate of lowering with the content of the pores in excess of 8 percent.

In general, the strength required for a diamond sintered body depends on the application thereof and the strength of the substance to be worked. For example, strength half as much again as that of a commercially available heat-resistant diamond sintered body is sufficient to improve efficiency of a tool for drilling relatively soft rocks and cutting ceramics. Therefore, at least the content of the pores must be not more than 7 percent by volume, and the diamond sintered body must contain a diamond content in excess of 93 percent by volume in such an application. If the content of the pores is less than 5 percent by volume, the strength of the diamond sintered body is over three times as much as that of the commercially available heat-resistant diamond sintered body, whereby efficiency of the diamond sintered body is improved to be preferable for drilling of hard rocks and cutting of hard ceramics.

In a method according to the present invention, obtained is a highly concentrated sintered body containing a diamond content in excess of 93 percent by volume by heating diamond powder material at a high temperature over 1300° C. to graphitize the surface of the diamond powder, whose particles are different in size from each other. However, if the diamond content exceeds 99 percent by volume, the strength of the diamond sintered body is rendered insufficient by shortage of content of an iron group metal.

The diamond sintered body according to the present invention preferably includes the smallest possible content of pores as shown in FIG. 1, whereas an iron group metal is required to obtain a strong sintered body as hereinabove described. Therefore, the sintered body according to the present invention contains at least 0.5 percent by volume of pores.

The inventors have studied deeply to obtain a diamond sintered body which is further excellent in heat resistance, and found that a diamond sintered body excellent in heat resistance and strength as hereinabove described, is one which contains 60 to 90 percent by volume of coarse diamond larger than 3 $\mu$m in particle size, and a residue including 5 to 39 percent by volume of a binder and pores at least 1 percent and not more than 5 percent by volume, the binder including 60 to 95 percent by volume of superfine diamond smaller than 1 $\mu$m in particle size, 0.1 to 5 percent by volume of a carbide selected from groups IVa, Va and VIa of the periodic table and an iron group metal not more than 10 percent by volume. In other words, the diamond sintered body according to the present invention contains coarse diamond larger than 3 $\mu$m in particle size and fine diamond smaller than 1 $\mu$m in particle size in the ratio of 60:38 to 90:6 in volume.

The diamond sintered body according to the present invention is obtained by sintering coarse diamond particles with a binder containing fine diamond particles. Thus, the binder is filled between the coarse diamond particles, whereby the sintered body contains considerable volume of diamond.

Figure 2:
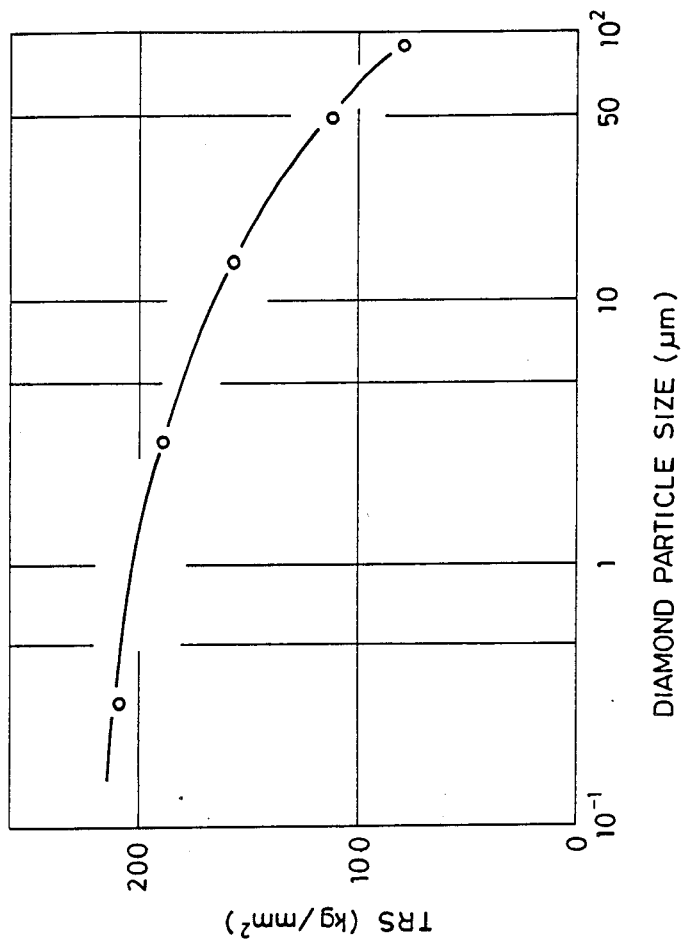
FIG. 2 is an illustration showing the relationship between diamond particle size and flexure resistance in the diamond sintered body.

The diamond sintered body according to the present invention is considered to be excellent in toughness and abrasion resistance for the following reason:

As shown in FIG. 2, the strength of a diamond sintered body is lowered with increase of the particle size. A diamond sintered body containing fine diamond particles is excellent in flexure resistance and toughness and hence the tip thereof is unlikely to be damaged, whereas the respective particles are retained by small diamond skeltons and bonding strength therebetween is weak. Thus, the respective diamond particles tend to fall off during cutting operation, leading to inferiority in abrasion resistance.

On the other hand, the coarse diamond particles are retained by larger diamond skeltons with excellent bonding strength between the respective diamond particles and hence a diamond sintered body containing the coarse diamond particles is excellent in abrasion resistance, whereas cracking caused in the larger skelton portions tends to be propagated to damage the tip and deteriorate its toughness.

The diamond sintered body according to the present invention is obtained by sintering coarse diamond particles utilizing a binder containing fine diamond particles, and hence the diamond sintered body thus obtained is considered to have the excellent toughness of the fine diamond particles and the excellent abrasion resistance of the coarse diamond particles.

The particle size of the coarse diamond contained in the diamond sintered body according to the present invention preferably exceeds 3 $\mu$m, since abrasion resistance is lowered if the particle size is smaller than 3 $\mu$m. A diamond sintered body containing diamond particles in size of 5 $\mu$m to 200 $\mu$m is most excellent in both toughness and abrasion resistance.

The coarse diamond powder material preferably contains 40 to 60 percent by volume of particles in average maximum particle size a, 30 to 40 percent by volume of particles in particle size a/2 and a residue including particles in particle size a/3 to a/1000 for obtaining a diamond sintered body which contains a high concentration of diamond.

The content of the coarse diamond particles is preferably 60 to 90 percent by volume, since the content less than 60 percent by volume leads to lowered abrasion resistance while that exceeding 90 percent by volume leads to reduced diamond content of the diamond sintered body and lowered toughness.

The particle size of the superfine diamond employed as the binder is smaller than 1 $\mu$m, preferably smaller than 0.5 $\mu$m, since the particle size exceeding 1 $\mu$m leads to lowered toughness of the diamond sintered body. The binder preferably contains 60 to 95 percent by volume of the superfine diamond particles, since a content of the superfine diamond particles which is less than 60 percent by volume, leads to lowered abrasion resistance of the binder, while that exceeding 95 percent by volume leads to lowered toughness of the binder.

The diamond sintered body according to the present invention contains diamond particles of various sizes, and if the diamond sintered body contains no metal or carbide selected from groups IVa, Va and VIa of the periodic table, abnormal integration of the iron group metal is caused particularly in the vicinity of fine diamond particles, thereby to define pores when the iron group metal is leached. Therefore, strength of the diamond sintered body is further improved when the same contains a metal or a carbide. The diamond sintered body preferably contains 0.1 to 3 percent by volume of the iron group metal and the metal or carbide selected from groups IVa, Va and VIa of the periodic table. If the content exceeds 3 percent by volume, cracking may be caused by a difference in thermal expansion between the same and the diamond, whereby the diamond may be graphitized leading to lowering of heat resistance. Although the content is preferably as small as possible, at least 0.1 percent by volume of the iron group metal etc. cannot be removed in practice.

It has been recognized that the diamond sintered body according to the present invention is particularly excellent in toughness, abrasion resistance and heat resistance when the carbide is prepared by tungsten carbide (WC) or molybdenum, tungsten carbide ((Mo,W)C) which is identical in crystal structure with tungsten carbide.

The diamond sintered body according to the present invention is further improved in characteristic when the same contains 0.005 to 0.25 percent by volume of boron or a boride or both. In general, diamond powder is sintered by dissolution or precipitation of diamond material by a catalyst such as an iron group metal under superhigh pressure/temperature. When at least one of the boron and the boride is added, a boride of the iron group metal is produced to lower the melting point and increase the speed of dissolution/precipitation, whereby it may be supposed that bonded portions of diamond particles, i.e., diamond skeleton portions, are grown to improve the retaining force of the diamond particles. When the content of the boron or the boride is less than 0.005 percent, formation of the diamond skeleton portions is retarded. On the other hand, if the content of the boron or the boride exceeds 0.25 percent, a considerable volume of boron enters the diamond skeleton portions to reduce the strength thereof.

The diamond powder material for manufacturing the diamond sintered body according to the present invention may be prepared by either of synthetic diamond and natural diamond.

In the method according to the present invention, powder prepared by diamond powder and particles of a carbide or a metal selected from groups IVa, Va and VIa of the periodic table and iron group metal powder of iron (Fe), cobalt (Co) or nickel (Ni) with or without the addition of boron or a boride, are evenly mixed by a means such as a ball mill so that the diamond sintered body may contain the metal or carbide selected from the groups IVa, Va and VIa of the periodic table. The iron group metal may not be mixed in the initial stage, and may be infiltrated in the powder material by bringing the powder material in contact with an iron group metal member when the same is sintered.

Further, as disclosed in Japanese Patent Application Laying-Open No. 136790/1978 by one of the inventors, a pot and a ball for ball-mill operation may be prepared by a sintered body composed of a carbide selected from the groups IVa, Va and VIa of the periodic table and an iron group metal to be mixed in, to pulverize the diamond powder by a ball mill while introducing fine particles of the sintered body of the carbide selected from the groups IVa, Va and VIa of the periodic table and the iron group metal from the pot and the ball.

The mixed powder is heated at a high temperature over 1300° C. to partially graphitize the diamond material, and is then introduced into a superhigh pressure/temperature apparatus to be sintered under a condition in which the diamond material is stable. The powder material must be sintered at a temperature higher than that of development of a eutectic liquid phase between the iron group metal and the compound, such as the carbide, as employed. The diamond sintered body thus manufactured is introduced into an acid, such as aqua regia which can corrode the iron group metal, whereby the iron group metal is removed to define the pores.

The diamond sintered body according to the present invention may be applied to a wiredrawing die, a ceramic cutting tool and a dresser etc. in addition to the drill bit.

EXAMPLE 1

Diamond particles of 100 $\mu$m, 50 $\mu$m, 20 $\mu$m and 5 to 0.2 $\mu$m in average particle size were mixed in the ratio of 5:3:1:1, and the mixed diamond material was pulverized for 5 minutes utilizing a pot and a ball of WC-Co cemented carbide. The diamond powder thus obtained was heated at a temperature of 1400° C. for 30 minutes in a vacuum; filled in a vessel of molybdenum to be in contact with a plate of cobalt placed on the mixed powder; and subjected to a pressure of 55 kb; and then heated at a temperature of 1460° C. by a superhigh pressure/temperature apparatus, and retained in this state for 10 minutes.

The sintered body thus obtained was taken out from the vessel and subjected to chemical analysis. As the result, the sintered body contained 96.5 percent by volume of diamond, 0.15 percent by volume of tungsten carbide and 3.35 percent by volume of cobalt.

Then the sintered body was introduced into heated aqua regia to leach cobalt, and the composition thereof was examined by a magnetic balance and by chemical analysis. As the result, the sintered body contained 96.5 percent by volume of diamond, 0.14 percent by volume of tungsten carbide, 0.4 percent by volume of cobalt and 2.96 percent by volume of pores. Compression strength of this sample was 380 Kg/mm$^2$.

Another sample for comparison with the above was experimentally prepared by diamond particles having the same maximum particle sizes to the above so that this sample contained 92.0 percent by volume of diamond, 7.7 percent by volume of pores and 0.3 percent by volume of cobalt. As the result, the compression strength of this sample for comparison was 120 Kg/mm$^2$.

Then heat resistance of the sintered body according to the present invention was tested by heating the same at a temperature of 1200° C. in a vacuum for 30 minutes. As the result, the sintered body presented no change in size or cracking.

EXAMPLE 2

Diamond particles of 80 μm, 40 μm, 15 μm and 0.5 μm in average particle size were mixed in the ratio of 5:3:2:1. The diamond powder thus obtained was mixed with various iron group metals and metals or carbides selected from groups IVa, Va and VIa of the periodic table as shown in Table 1 to complete the diamond material, which was then filled in a vessel of tantalum (Ta) and sintered in a similar manner to Example 1 under a condition of 58 kb and 1500° C. The respective sintered bodies thus obtained were taken out from the vessel of tantalum to treat the same in heated aqua regia. The content of pores in each sintered body was then measured. The results are shown in Table 1.

Then each diamond sintered body was cut in the form of a cube having a side of 3 mm to be sintered and fixed by a high melting point/high hardness matrix of mixed powder of tungsten, tungsten carbide, iron, cobalt, nickel and copper at a temperature of 1100° C., thereby to form a surface-set core bit.

Prepared for comparison therewith was a core bit formed by a commercially available sintered body of diamond particles of 40 to 60 μm in particle size, which is shown by symbol X in Table 1, and a core bit formed by a sintered body of natural diamond, which is shown by symbol Y in Table 1.

Each of the samples A to L, X and Y as shown in Table 1 was adapted to drill graphite having uniaxial compression strength of 1600 to 2000 Kg/cm$^2$ by 900 r.p.m. The advancing speed and the life of each sample is shown in Table 2.

TABLE 1

| Sample | *1 Diamond Material | *1 Iron Group Metal | *1 *2 Carbide | *1 *3 *Pore |
|---|---|---|---|---|
| A | 99.5 | 0.5 Co | | 0.3 |
| B | 99.0 | 0.8 Co. | 0.2 WC | 0.7 |
| C | 98.0 | 1.8 Co | 0.2 WC | 1.6 |
| D | 97.0 | 1.5 Co, 1.0 Ni | 0.5 (MoW)C | 2.3 |
| E | 96.0 | 3.7 Co | 0.3 TaC | 3.6 |
| F | 96.0 | 3.8 Co | 0.1 TiC, 0.1 NbC | 3.5 |
| G | 96.0 | 3.0 Co, 0.7 Ni | 0.2 WC, 0.1 HfC | 3.5 |
| H | 96.0 | 3.7 Co | 0.3 WC | 3.6 |
| I | 95.0 | 5 Co | | 4.7 |
| J | 95.0 | 5 Co | | 1.0 |
| K | 95.0 | 4.5 Co | 0.5 WC | 4.4 |
| L | 93.0 | 6.5 Co | 0.5 WC | 6.2 |
| X | Commercially Available Sintered Diamond | | | |
| Y | Natural Diamond | | | |

*1: Unit: volume %
*2: Carbide of metal selected from groups IVa, Va and VIa of the periodic table
*3: Volume of pores after acid treatment

TABLE 2

| | Result of Granite Drilling | |
|---|---|---|
| Sample | Advancing Speed (m/min) | Life (m) |
| A | 10 | 1 |
| B | 15 | over 50 |
| C | 18 | " |
| D | 20 | " |
| E | 18 | " |
| F | 17 | " |
| G | 18 | " |
| H | 16 | " |
| I | 15 | " |
| J | cracked in formation of bit | |
| K | 17 | over 50 |
| L | 12 | 15 |
| X | 12 | 10 |
| Y | 5 | 45 |

EXAMPLE 3

Diamond powder of 0.8 μm in average particle size and boron powder were pulverized and mixed by a pot and a ball of WC-Co cemented carbide. The mixed powder was mixed with diamond particles of 60 μm, 30 μm and 10 μm in average particle size in the ratio of 1:5:3:1, heated at a temperature of 1450° C. for one hour in a vacuum, and sintered in a similar manner to Example 1 under a condition of 55 kb and 1450° C. As the result of analysis, the sintered body thus obtained contained 96.2 percent by volume of diamond, 3.45 percent by volume of cobalt, 0.1 percent by volume of nickel, 0.2 percent by volume of tungsten carbide and 0.05 percent by volume of boron. The sintered body was then treated in heated aqua regia, whereby 3.3 percent by volume of pores were defined.

The sintered body was adapted to cut an alumina ceramic member having Vickers hardness of 2300 at cutting speed of 60 m/min, depth of cut of 0.03 mm and feed rate of 0.05 mm/rev. employing a water-soluble cutting liquid for 15 minutes.

For comparison therewith, another alumina ceramic member was cut by a commercially available heat-resistant diamond material of 40 μm to 60 μm in particle size containing 8 percent by volume of pores.

As the result, the flank wear width of the sintered body according to the present invention was 0.15 mm, while that of the commercially available heat-resistant diamond material was 0.58 mm.

EXAMPLE 4

Various diamond sintered bodies of 60 μm in maximum particle size and different in diamond content from each other were prepared in a similar manner to Example 3 by varying the ratio of mixing of diamond particles varied in particle size and conditions of graphitization treatment, and then subjected to acid treatment to form heat-resistant diamond sintered bodies. Diamond content and pore content of each sintered body are shown in Table 3.

TABLE 3

| Sample | Diamond Content (volume %) | Pore (volume %) | Metal plus Carbide (volume %) |
|---|---|---|---|
| M | 96.8 | 2.8 | 0.4 |
| N | 95.1 | 4.6 | 0.3 |
| O | 94.3 | 5.5 | 0.2 |
| P | 93.0 | 6.8 | 0.2 |
| Q | 92.1 | 7.7 | 0.2 |
| R | 91.0 | 8.8 | 0.2 |

Each of the sintered bodies M to R as shown in Table 3 was processed as a blank for cutting work, which was adapted to cut andesite having compression strength of 1000 to 1100 Kg/cm² at cutting speed of 200 m/min, depth of cut of 1 mm and feed rate of 0.3 mm/rev. by a wet method for 20 minutes, to measure the flank wear width. The results are shown in FIG. 3.

As obvious from FIG. 3, the samples M, N, O and P, each containing pores of less than 7 percent by volume, are by far smaller in flank wear width than the samples Q and R which contain pores in excess of 7 percent by volume.

apparatus and then heated at a temperature of 1450° C.; and retained in this state for 15 minutes. The sintered body thus obtained was taken out from the vessel and dipped in heated aqua regia to leach cobalt. As the result of chemical analysis, the sintered body presented the composition as shown in Table 4. The diamond sintered body was heated at a temperature of 1200° C. in a vacuum for 30 minutes, to measure strength thereof by a flexure test.

Measured for comparison was strength of diamond sintered bodies as shown in Table 4.

TABLE 4

| No. | 1 | 2 | 3 | 4 | 5 | 6 | 7 |
|---|---|---|---|---|---|---|---|
| Coarse Diamond Mixing Ratio | | | | 100 μm:50% 50 μm:30% 10~20 μm:20% | | | |
| Content | | | 88% | | 92% | 50% | 50% |
| Coarse Diamond: Fine Diamond (volume ratio) | | | 89:11 | | 92.7:7.3 | | 52.4:47.6 |
| Leaching of Iron Group Metal | Yes | No | Yes | No | Yes | Yes | Yes |
| Result of Analysis:Content of Co, Wc in Binder (%) | Co 1.0 WC 0.8 | Co 20.2 WC 0.9 | Co 1.0 WC 0.8 | Co 20.2 WC 0.9 | Co 1.2 WC 0.8 | Co 2.0 WC 0.8 | Co 2.0 WC 0.8 |
| Volume of Pores in Sintered Body | 2.8% | 0 | 2.8% | 0 | 5.3% | 8.0% | 8.0% |
| Heating 1200° C. × 30 min. | Yes | Yes | No | No | Yes | Yes | No |
| Strength (Kg/mm²) | 130 | Cracked Measurement Impossible | 150 | 155 | 60 | 65 | 90 |
| Diamond Content in Sintered Body (volume %) | | | 97.2 | | 94.7 | | 91.6 |

| No. | 8 | 9 | 10 | 11 | 12 |
|---|---|---|---|---|---|
| Coarse Diamond Mixing Ratio | | | 50 μm:55% 20~30 μm:35% 5~10 μm:10% | | |
| Content | | | 85% | | |
| Coarse Diamond: Fine Diamond (volume ratio) | | | 86.2:13.8 | | |
| Leaching of Iron Group Metal | Yes | Yes | Yes | Yes | Yes |
| Result of Analysis:Content of Co, Wc in Binder (%) | Co 2.0 WC 0.7 | Co 2.0 WC 0.7 | Co 5.0 WC 0.8 | Co 11 WC 0.8 | Co 11 WC 0.8 |
| Volume of Pores in Sintered Body | 3.1% | 3.1% | 2.6% | 1.7% | 1.7% |
| Heating 1200° C. × 30 min. | Yes | No | Yes | Yes | No |
| Strength (Kg/mm²) | 145 | 160 | 125 | Cracked Measurement Impossible | 16 |
| Diamond Content in Sintered Body (volume %) | | | 96.5 | | |

EXAMPLE 5

Synthetic diamond powder of 1 μm in particle size was pulverized by a pot and a ball of WC-Co cemented carbide. The powder thus obtained contained 91 percent by volume of fine diamond of 0.5 μm in average particle size, 7 percent by volume of tungsten carbide and 2 percent by volume of cobalt. This powder was mixed with coarse diamond powder as shown in Table 4. The mixed powder was heated in a vacuum of $10^{-4}$ Torr. at a temperature of 1500° C. for 30 minutes; filled in a vessel of molybdenum to be in contact with a plate of cobalt placed on the completed powder; and subjected to a pressure of 55 kb by a superhigh pressure

EXAMPLE 6

The diamond sintered bodies of sample Nos. 3, 7, 9 and 12 in Table 4 were processed to form tools for cutting. A reference tool was prepared for comparison by a commercially available diamond sintered body with leaching of cobalt and including pores of about 10 percent. The tools prepared by the samples Nos. 3, 7, 9 and 12 and the commercially available diamond sintered body were applied to cutting of granite in dry condition at a speed of 100 m/min. for 10 minutes. The results are as shown in Table 5.

TABLE 5

| Sample No. | Result of Cutting (flank wear width mm) |
| --- | --- |
| 3 | 0.56 |
| 7 | tool worn upon cutting for 3 minutes, incapable of cutting |
| 9 | 0.63 |
| 12 | tool worn upon cutting for 1 minutes, incapable of cutting |
| Commercially Available Sintered Body | tool damaged upon cutting for 10 seconds |

EXAMPLE 7

Binder powder materials as shown in Table 6 were prepared with fine diamond of 0.5 μm in average particle size. The binders were mixed with coarse diamond particles including diamond particles of 80 μm, 40 μm and 5 to 20 μm in the ratio of 6:3:1, in such ratios as shown in Table 7, to obtain completed powder material.

TABLE 6

| | | Content (volume %) | |
| --- | --- | --- | --- |
| | Fine Diamond | Carbide of Groups IVa, Va, VIa of Periodic Table | Iron Group Metal |
| 7A | 91 | 6 WC | 3 Co |
| 7B | 90 | 3 (Mo,W)C | 7 Co |
| 7C | 80 | 3 WC;1 TiC | 3 Ni;13 Co |
| 7D | 60 | 1 TaC;2 NbC;2 WC | 20 Co;15 Fe |
| 7E | 50 | 5 WC | 45 Co |
| 7F | 80 | 10 WC | 10 Co |

TABLE 7

| No. | Content of Coarse Diamond | Coarse Diamond: Fine Diamond (volume ratio) | Binder | Volume of Pores after Acid Treatment (%) | Flank Wear Width after Ceramic Cutting (mm) | Diamond Content in Sintered Body (%) |
| --- | --- | --- | --- | --- | --- | --- |
| 13 | 85 | 86.2:13.8 | 7A | 0.3 | 0.53 | 98.5% |
| 14 | 70 | 72.2:27.8 | 7B | 1.7 | 0.28 | 97.0% |
| 15 | 75 | 79:21 | 7C | 2.2 | 0.55 | 95.0% |
| 16 | 90 | 93.75:6.25 | 7D | 3.3 | 0.43 | 96.0% |
| 17 | 85 | 91.9:8.1 | 7E | 6.5 | 0.89 | 92.2% |
| 18 | 95 | 95.5:4.5 | 7B | — | not completely sintered | 99.0% |
| 19 | 60 | 62.5:37.5 | 7B | 2.3 | 0.37 | 96.0% |
| 20 | 50 | 52.6:47.4 | 7B | 2.8 | 0.65 | 95.0% |

Each completed powder material was processed in a vacuum at a temperature of 1450° C. for one hour and filled in a vessel of molybdenum to be sintered under a superhigh pressure in a similar manner to Example 1, and the diamond sintered body thus obtained was taken out from the vessel and treated in heated aqua regia for 100 hours. The results are shown in Table 7 with the contents of pores in the sintered bodies after leaching of the iron group metals. The sintered bodies were employed to form cutting tools for cutting alumina having Vickers hardness of 2000 at a speed of 80 m/min. in dry condition for 15 minutes, to examine heat resistance and strength. The results are also shown in Table 7.

EXAMPLE 8

Diamond powder of 0.5 μm in average particle size and powder of boron were pulverized and mixed by a pot and a ball of WC-Co cemented carbide. The mixed powder thus obtained contained 87 percent by volume of fine diamond of 0.3 μm in average particle size, 4 percent by volume of tungsten carbide, 8 percent by volume of cobalt and 10 percent by volume of boron. This powder was mixed in the ratio of 15:85 with coarse diamond powder obtained by mixing diamond particles of 100–150 μm, 50–80 μm and 10–30 μm in average particle size in the ratio of 55:30:15, to be processed in a vacuum at a temperature of 1400° C. for one hour. Therefore, in this Example a volume ratio of coarse diamond to fine diamond was 86.7/13.3.

The completed powder thus obtained was filled in a vessel of molybdenum to be in contact with a plate of cobalt placed on the powder, and sintered in a similar manner to Example 5. The diamond sintered body thus obtained contained 0.1 percent by weight of boron.

Then the diamond sintered body was processed to form a column of 1.5 mm in diameter and 3 mm in length, to be treated in heated aqua regia for 150 hours. The diamond sintered body thus treated contained 2.5 percent by volume of pores and 97.3 percent by volume of diamond. The sintered body was sintered and fixed to a shank of steel by a high melting point/high hardness matrix of mixed powder of tungsten, tungsten carbide, iron, cobalt, nickel and copper at a temperature of 1100° C, to form a surface-set core bit.

Prepared for comparison therewith was a core bit formed by a commercially available sintered body of diamond particles of 40 to 60 μm in particle size with leaching of a binder prepared by cobalt.

These core bits were tested to drill andesite having uniaxial compression strength of 180 Kg/mm$^2$ by 900 r.p.m.

As the result, the core bit formed by the diamond sintered body according to the present invention was still capable of drilling after drilling the andesite in 50 m at an advancing speed of 15 cm/min., while the life of the bit formed by the commercially available diamond sintered body ended upon drilling in 15 m at an advancing speed of 8 cm/min.

Description is now made of a compound type diamond sintered body obtained by directly or indirectly bonding the aforementioned diamond sintered body according to the present invention to a cemented carbide base material.

The compound type diamond sintered body comprises the above described diamond sintered body and a base material of cemented carbide, so that toughness of the cemented carbide is added to the diamond sintered body. Therefore, the compound type diamond sintered body is applicable to services such as cutting of hard ceramics and drilling of hard rocks in which high stress is applied to the tool.

When the diamond sintered body is directly bonded to cemented carbide, a layer rich in an iron group metal may be formed in the junction thereof, whereby the iron group metal in this said portion is leached in acid treatment to lower bonding strength. Therefore, the diamond sintered body is preferably bonded to the cemented carbide base material through an intermediate bonding layer formed by a cubic crystal type carbide, nitride or carbo-nitride selected from groups IVa, Va and VIa of the periodic table, such as that disclosed in U.S. Pat. No. 4403015, thereby to prevent such corrosion and obtain a diamond sintered body excellent in bonding strength. Thickness of the intermediate bonding layer is preferably less than 0.5 mm, since the intermediate bonding layer having thickness in excess of 0.5 mm is worn when the same is applied to the tip of a drilling bit or the like.

In the manufacturing method according to the present invention, the metal or carbide selected from groups IVa, Va and VIa of the periodic table is added to the diamond sintered body by uniformly mixing diamond powder with the carbide or metal selected from the groups IVa, Va and VIa of the periodic table, and powder of an iron group metal such as iron, cobalt and nickel with or without addition of boron or a boride by such means as a ball mill. The iron group metal may not be mixed in the initial stage, but infiltrated in sintering by bringing the sintered body in contact with a member formed of the iron group metal.

As disclosed in Japanese patent application Laying-Open No. 136790/1978 by one of the inventors, a pot and a ball for ball-milling may be prepared by a sintered body of the carbide selected from the groups IVa, Va and VIa of the periodic table to be mixed in the diamond sintered body and an iron group metal, thereby to simultaneously mix fine powder of the sintered body formed by the carbide selected from groups IVa, Va and VIa of the periodic table and the iron group metal in the diamond powder when the same is pulverized by the ball mill.

The mixed powder is heated at a high temperature over 1300° C. to partially graphitize the diamond material and is filled in a vessel to be in contact with cemented carbide directly or through the intermediate bonding layer, and then the vessel is introduced into a superhigh pressure/temperature apparatus to be sintered under a condition at which the diamond material is stable and simultaneously bonded to the cemented carbide. The powder material must be sintered at a temperature higher than that of development of a eutectic liquid phase between the iron group metal and the employed compound such as carbide.

The diamond sintered body obtained in the aforementioned manner is then treated by a liquid having an oxidation characteristic such as heated aqua regia, nitric acid or hydrofluoric acid. By such treatment in the liquid having the oxidation characteristic, the iron group metal and the metal or carbide selected from the groups IVa, Va and VIa of the periodic table contained in the diamond sintered body, can be leached. On the other hand, when the base material formed by cemented carbide is treated with the diamond sintered body in the liquid having the oxidation characteristic, an oxide film is formed on the surface of the cemented carbide thereby to prevent leaching of the iron group metal in the cemented carbide.

It is to be noted that only the diamond sintered layer may be dipped in the aforementioned liquid having the oxidation characteristic.

The diamond sintered body thus obtained can be applied to a cutting tool for working ceramics, a dresser and the like in addition to a drilling bit.

EXAMPLE 9

Diamond particles of 80 $\mu$m, 35 $\mu$m, 20 $\mu$m and 5–0.2 $\mu$m in average particle size were mixed in the ratio of 5:35:1:1 and pulverized by a pot and a ball of WC-Co cemented carbide for 5 minutes. The powder thus obtained was heated in a vacuum at a temperature of 1400° C. for 30 minutes. A WC-12% Co disc was coated by powder containing 60 percent by volume of cubic crystal type nitride boron and a residue including titanium nitride (TiN) and aluminum (Al) and introduced in a vessel of molybdenum. Then the aforementioned mixed powder was filled in the vessel to be in contact with a plate of cobalt which was placed on the completed powder, and introduced into a superhigh pressure/temperature apparatus to be subjected to a pressure of 55 kb and heated at a temperature of 1460° C., and retained in this state for 10 minutes. The sintered body thus obtained was taken out from the vessel, whereby it was observed that the diamond sintered body was securely bonded to the cemented carbide base material through the intermediate bonding layer having the thickness of 0.5 mm.

Then, only the diamond sintered body was subjected to chemical analysis, to find that the same contained 96.0 percent by volume of diamond, 0.15 percent by volume of tungsten carbide and 3.85 percent by volume of cobalt.

Then the aforementioned diamond sintered body bonded to the cemented carbide base material through the intermediate bonding layer was dipped in heated aqua regia to be treated for 50 hours, whereby cobalt and tungsten carbide were partially leached from the diamond sintered body, which contained 96.0 percent by volume of diamond, 0.14 percent by volume of tungsten carbide, 0.8 percent by volume of cobalt and 3.06 percent by volume of pores, while only the surface of the cemented carbide base material was oxidized, and substantially no cobalt was leached from the interior. Further, no corrosion of the intermediate bonding layer was observed.

The aforementioned substance was processed as a tool for cutting silicon nitride (Si$_3$N$_4$) having Vickers hardness of 1800 at a cutting speed of 80 m/min., depth of cut of 1 mm, feed rate of 0.1 mm/rev. in dry condition for 10 minutes.

Employed for comparison were a sintered body before aqua regia treatment and a commercially available heat-resistant diamond sintered body including 8 percent by volume of pores and not bonded to a base material of cemented carbide to cut trisilicon tetranitride under the same condition to the above.

As the result, the flank wear width of the diamond tip according to Example 9 was 0.15 mm while that of the tip with no leaching of cobalt was 0.35 mm. The commercially available diamond sintered body was damaged upon cutting for 30 seconds to be incapable of cutting.

EXAMPLE 10

Diamond particles of 80 $\mu$m, 40 $\mu$m, 15 $\mu$m and 0.5 $\mu$m in average particle size were mixed in the ratio of 5:3:2:1. This powder was mixed with various iron group metals and metals or carbides selected from groups IVa, Va and VIa of the periodic table as shown in Table 8 to obtain completed powder materials. Then the completed powder materials were heated in a vacuum at a temperature of 1350° C. to partially graphitize the diamond particles. An alloy of WC-15% Co was placed in a vessel of tantalum (Ta), on which the completed powder materials were filled to be sintered in a condition of 58 kb and 1500° C. The respective sintered bodies thus obtained were taken out from the vessel of tantalum so that only the diamond sintered layers were dipped in an electrolytic solution to leach the iron group metals from the diamond sintered bodies.

Also shown in FIG. 8 is the contents of pores in the diamond sintered bodies.

The respective diamond sintered bodies were brazed to bit bodies through base materials of cemented carbide, to form core bits.

Prepared for comparison were a surface-set core bit of natural diamond and a core bit of a diamond sintered body with no leaching of a iron group metal.

The respective samples were adapted to drill andesite having uniaxial compression strength of 1600–1700 Kg/cm$^2$ by 500 r.p.m. Table 9 shows the advancing speed and the life of each sample.

TABLE 8

| Sample | *1 Diamond Material | *1 Iron Group Metal | *1 *2 Carbide | *1 *3 Pore |
|---|---|---|---|---|
| 10A | 99.5 | 0.5 Co | | 0.2 |
| 10B | 99.0 | 1.0 Co | | 0.5 |
| 10C | 98.0 | 1.8 Co | 0.2 WC | 1.4 |
| 10D | 97.0 | 1.5 Co, 1.0 Ni | 0.5 (MoW)C | 2.1 |
| 10E | 96.0 | 3.7 Co | 0.3 TaC | 3.3 |
| 10F | 96.0 | 3.8 Co | 0.1 TiC, 0.1 NbC | 3.2 |
| 10G | 96.0 | 3.0 Co, 0.7 Ni | 0.2 WC, 0.1 HfC | 3.2 |
| 10H | 96.0 | 3.7 Co | 0.3 WC | 3.3 |
| 10I | 95.0 | 5 Co | | 4.3 |
| 10J | 95.0 | 5 Co | | 0.8 |
| 10K | 95.0 | 4.5 Co | 0.5 WC | 4.2 |
| 10L | 93.0 | 6.5 Co | 0.5 WC | 6.0 |
| 10X | 95.0 | 5 Co | | 0 |
| Y | Natural Diamond | | | |

*1: Unit: volume %
*2: Carbide of metal selected from groups IVa, Va and VIa of the periodic table
*3: Volume of pores after acid treatment

TABLE 9

| | Result of Granite Drilling | |
|---|---|---|
| Sample | Advancing Speed (cm/min) | Life (m) |
| 10A | 11 | 1.5 |
| 10B | 16 | over 80 |
| 10C | 20 | " |
| 10D | 21 | " |
| 10E | 20 | " |
| 10F | 18 | " |
| 10G | 20 | " |
| 10H | 17 | " |
| 10I | 16 | " |
| 10J | 12 | " |
| 10K | 18 | over 80 |
| 10L | 14 | 30 |
| 10X | 10 | 15 |
| 10Y | 7 | 70 |

EXAMPLE 11

Diamond powder of 0.8 μm in average particle size and powder of boron were pulverized and mixed by a pot and a ball of WC-Co cemented carbide. The powder material thus obtained was mixed with diamond particles of 50 μm, 25 μm and 10 μm in average size in the ratio of 1:5:3:1, to be heated in a vacuum at a temperature of 1450° C. for one hour and sintered under a condition of 55 kb and 1450° C. in a similar manner to Example 9. Recognized by analysis was that the obtained diamond sintered body contained 96.0 percent by volume of diamond, 3.65 percent by volume of cobalt, 0.1 percent by volume of nickel, 0.2 percent by volume of tungsten carbide and 0.05 percent by volume of boron. This diamond sintered body alone was treated in heated aqua regia, to define 3.4 percent by volume of pores.

The diamond sintered body was adapted to cut alumina ceramics having Vickers hardness of 2300 at a cutting speed of 80 m/min., depth of cut of 2 mm and feed rate of 0.1 mm/rev. for 15 minutes by employing water-soluble cutting liquid.

Prepared for comparison was a commercially available heat-resistant diamond material of 40 to 60 μm in particle size containing 8 percent by volume of pores, which was not bonded to cemented carbide.

As the result, the flank wear width of the diamond sintered body according to the present invention was 0.25 mm while the commercially available heat-resistant diamond material was damaged after cutting for two minutes.

EXAMPLE 12

Heat-resistant diamond tips were prepared by changing mixing ratios and graphitizing process conditions of diamond particles in different particle sizes to form various diamond sintered bodies having the maximum particle size of 60 μm and in various diamond contents in a similar manner to Example 11, with only the diamond sintered bodies being subjected to acid treatment. Table 10 shows the contents of diamond and pores of the respective diamond sintered bodies.

TABLE 10

| Sample | Diamond Content (volume %) | Pores (volume %) | Metal + Carbide (volume %) |
|---|---|---|---|
| 12M | 97.1 | 2.5 | 0.4 |
| 12N | 95.0 | 4.6 | 0.4 |
| 12O | 94.5 | 5.2 | 0.3 |
| 12P | 93.1 | 6.8 | 0.3 |
| 12Q | 92.0 | 7.6 | 0.4 |
| 12R | 91.0 | 8.8 | 0.2 |

The respective diamond sintered bodies 12M to 12R as shown in Table 10 were processed as tips for cutting andesite having uniaxial compression strength of 900 to 1000 Kg/cm$^2$ at a cutting speed of 150 m/min., depth of cut of 2 mm and feed rate of 0.3 mm/rev., in dry condition for 20 minutes, to measure the flank wear width. The results are shown in FIG. 4.

As is obvious from FIG. 4, the samples 12M, 12N, 12O and 12P respectively containing less than 7 percent by volume of pores are remarkably smaller in flank wear width than the samples 12Q and 12R respectively containing pores in excess of 7 percent by volume.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A diamond sintered body for tools, having a diamond content in excess of 95 percent and not more than 99 percent by volume, and a residue including at least one of a metal or a carbide selected from groups IVa, Va and VIa of the periodic table, and an iron group metal of 0.1 to 3 percent by volume in total, and pores at least 0.5 percent and not more than 5 percent by volume.

2. A diamond sintered body for tools in accordance with claim 1, wherein said diamond contained in said diamond sintered body contains coarse diamond larger than 3 μm in particle size and fine diamond smaller than 1 μm in particle size in a volume ratio of 60:38 to 90:6.

3. A diamond sintered body for tools in accordance with claim 2, wherein the particle size of said coarse diamond is at least 5 μm and not more than 200 μm.

4. A diamond sintered body for tools in accordance with claim 1, wherein said carbide selected from said groups IVa, Va and VIa of the periodic table is tungsten carbide (WC) or molybdenum tungsten carbide ((MoW)C) which is identical in crystal structure with tungsten carbide.

5. A diamond sintered body for tools in accordance with claim 1, further containing at least one of boron and a boride of 0.005 to 0.25 percent by volume in total.

6. A compound diamond sintered body comprising a diamond sintered body for tools in accordance with claim 1 and a cemented carbide base material bonded to said diamond sintered body for tools.

7. A compound diamond sintered body in accordance with claim 6, wherein said diamond sintered body for tools and said cemented carbide base material are bonded to each other through an intermediate bonding layer.

8. A compound diamond sintered body comprising a diamond sintered body for tools in accordance with claim 5 and a cemented carbide base material bonded to said diamond sintered body for tools.

9. A compound diamond sintered body in accordance with claim 8, wherein said diamond sintered body for tools and said cemented carbide base material are bonded to each other through an intermediate bonding layer.

10. A method of manufacturing a diamond sintered body for tools in accordance with claim 1, said method comprising the steps of:
 (a) preparing diamond power or mixed powder of diamond power and a metal or a carbide selected from groups IVa, Va and VIa of the periodic table and an iron group metal;
 (b) graphitizing a part of the diamond powder in the mixed powder at a temperature over 1300° C.;
 (c) bringing the diamond powder in contact with an iron group metal or a sintered carbide selected from groups IVa, Va and VIa of the periodic table to form a sintered body by performing a hot press operation utilizing a superhigh pressure/temperature apparatus under a high temperature and a high pressure for retaining the diamond stable; and
 (d) subjecting the sintered body to acid treatment to leach parts of the iron group metal and the metal or carbide selected from groups IVa, Va and VIa of the periodic table.

11. A method of manufacturing a diamond sintered body for tools in accordance with claim 10, wherein the carbide selected from groups IVa, Va and VIa of the periodic table is tungsten carbide or (molybdenum tungsten) carbide identical in crystal structure with tungsten carbide.

12. A method of manufacturing a compound diamond sintered body in accordance with claim 6, said method comprising the steps of:
 (a) preparing diamond powder or mixed powder of diamond powder and a metal or a carbide selected from groups IVa, Va and VIa of the periodic table and an iron group metal;
 (b) graphitizing a part of the diamond powder in the mixed powder at a temperature over 1300° C;
 (c) bringing the mixed powder in contact with a cemented carbide base material;
 (d) bringing the mixed powder in contact with an iron group metal or a sintered carbide selected from groups IVa, Va and VIa of the periodic table to form a compound sintered body by employing a superhigh pressure/temperature apparatus under a high temperature and a high pressure for retaining the diamond stable; and
 (e) treating the compound sintered body in an oxidation liquid to leach parts of the iron group metal and the metal or carbide selected from groups IVa, Va and VIa of the periodic table.

13. A method of manufacturing a compound diamond sintered body in accordance with claim 12, wherein the diamond mixed powder is brought into contact with the cemented carbide base material through an intermediate bonding layer.

14. A method of manufacturing a compound diamond sintered body in accordance with claim 12, wherein an oxide film layer is formed on the surface of the cemented carbide base material in said step (e) to prevent leaching of the iron group metal in the cemented carbide base material by the oxidation liquid.

15. A method of manufacturing a diamond sintered body for tools in accordance with claim 1, said method comprising the steps of:
 (a) preparing mixed powder of diamond powder and an iron group metal, or of diamond powder, a metal or a carbide selected from groups IVa, Va and VIa of the periodic table and the iron group metal;
 (b) graphitizing a part of the diamond powder in the mixed powder at a temperature over 1300° C.;
 (c) forming a sintered body by performing a hot press operation utilizing a superhigh pressure/temperature apparatus under a high temperature and a high pressure for retaining the diamond stable; and
 (d) subjecting the sintered body to acid treatment to leach a part of the iron group metal or the metal or carbide selected from groups IVa, Va and VIa of the periodic table.

16. A method of manufacturing a diamond sintered body for tools in accordance with claim 15, wherein the carbide selected from groups IVa, Va and VIa of the periodic table is tungsten carbide or molybdenum tungsten carbide identical in crystal structure with tungsten carbide.

17. A method of manufacturing a compound diamond sintered body in accordance with claim 6, said method comprising the steps of:
 (a) preparing mixed powder of diamond powder and an iron group metal, or of diamond powder, a metal or a carbide selected from groups IVa, Va and VIa of the periodic table and the iron group metal;
 (b) graphitizing part of the diamond powder in the mixed powder at a temperature over 1300° C.;
 (c) bringing the diamond into contact with a cemented carbide base material and forming a sintered body by performing a hot press operation utilizing a superhigh pressure/temperature apparatus under a high temperature and a high pressure for retaining the diamond stable; and (d) treating the sintered body in an oxidation liquid to leach a part of the iron group metal or the metal or carbide selected from groups IVa, Va and VIa of the periodic table.

18. A method of manufacturing a compound diamond sintered body in accordance with claim 17, wherein the diamond is brought into contact with the cemented carbide base material through an intermediate bonding layer.

19. A method of manufacturing a compound diamond sintered body in accordance with claim 17, wherein said step (d) includes forming an oxide film layer on the surface of the cemented carbide base material.

20. A method of manufacturing a diamond sintered body for tools in accordance with claim 6, said method comprising the steps of:
 (a) preparing mixed powder of a diamond powder and boron or a boride, or of diamond powder and a metal or a carbide selected from groups IVa, Va and VIa of the periodic table, an iron group metal and the boron or the boride;
 (b) graphitizing a part of the diamond powder in the mixed powder at a temperature over 1300° C.;
 (c) forming a sintered body by bringing the powder in contact with an iron group metal or a sintered carbide selected from groups IVa, Va and VIa of the periodic table and performing a hot press operation utilizing a superhigh pressure/temperature apparatus under a high temperature and a high pressure for retaining the diamond stable; and
 (d) subjecting the sintered body to acid treatment to leach parts of the iron group metal, the metal or carbide selected from groups IVa, Va and VIa of the periodic table, and the at least one of the boron and the boride.

21. A method of manufacturing a diamond sintered body for tools in accordance with claim 20, wherein the carbide selected from groups IVa, Va and VIa of the periodic table is tungsten carbide or molybdenum tungsten carbide identical in crystal structure with tungsten carbide.

22. A method of manufacturing a compound diamond sintered body in accordance with claim 8, said method comprising the steps of:
 (a) preparing mixed power of diamond powder and boron or a boride, or of diamond powder and a metal or a carbide selected from groups IVa, Va and VIa of the periodic table, an iron group metal or a boride;
 (b) graphitizing a part of the diamond powder in the mixed powder at a temperature over 1300° C.;
 (c) bringing the diamond in contact with a cemented carbide base material, placing an iron group metal or a sintered carbide selected from groups IVa, Va and VIa of the periodic table on the diamond to be in contact therewith, and performing a hot press operation utilizing a superhigh pressure/temperature apparatus under a high temperature and a high pressure for retaining the diamond stable to form a sintered body; and
 (d) treating the sintered body in an oxidation liquid to leach parts of the iron group metal and the metal or carbide selected from groups IVa, Va and VIa of the periodic table.

23. A method of manufacturing a compound diamond sintered body in accordance with claim 22, wherein the diamond is brought into contact with the cemented carbide base material through an intermediate bonding layer.

24. A method of manufacturing a compound diamond sintered body in accordance with claim 22, wherein said step (d) includes forming an oxide film layer on the surface of the cemented carbide base material.

25. A method of manufacturing a diamond sintered body for tools in accordance with claim 6, said method comprising the steps of:
 (a) preparing mixed powder of diamond powder, an iron group metal and at least one of boron and a boride, or of diamond powder, a metal or a carbide selected from groups IVa, Va and VIa of the periodic table, an iron group metal and at least one of the boron and the boride;
 (b) graphitizing a part of the diamond powder in the mixed powder at a temperature over 1300° C.;
 (c) forming a sintered body by performing a hot press operation utilizing a superhigh pressure/temperature apparatus under a high temperature and a high pressure for retaining the diamond stable; and
 (d) subjecting the sintered body to acid treatment to leach parts of the iron group metal, the metal or carbide selected from groups IVa, Va and VIa of the periodic table and the at least one of the boron and the boride.

26. A method of manufacturing a diamond sintered body for tools in accordance with claim 25, wherein the carbide selected from groups IVa, Va and VIa of the periodic table is tungsten carbide or molybdenum tungsten carbide identical in crystal structure with tungsten carbide.

27. A method of manufacturing a compound diamond sintered body in accordance with claim 8, said method comprising the steps of:
 (a) preparaing mixed powder of diamond powder, an iron groups metal and at least one of boron and a boride, or of diamond powder, a metal or a carbide selected from groups IVa, Va and VIa of the periodic table, an iron group metal and at least one of the boron and the boride;
 (b) graphitizing a part of the diamond powder in the mixed powder at a temperature over 1300° C.;
 (c) forming a sintered body by performing a hot press operation utilizing a superhigh pressure/temperatue apparatus under a high temperature and a high pressure for retaining the diamond stable by bringing the mixed powder in contact with cemented carbide; and
 (d) treating the sintered body in an oxidation liquid to leach parts of the iron group metal and the metal or carbide selected from groups IVa, Va and VIa of the periodic table.

28. A method of manufacturing a compound diamond sinter body in accordance with claim 27, wherein the diamond is brought into contact with the cemented carbide base material through an intermediate bonding layer.

29. A method of manufacturing a compound diamond sintered body in accordance with claim 27, wherein said step (d) includes forming an oxide film layer on the surface of the cemented carbide base material to prevent leaching of the iron group metal in the cemented carbide base material by the oxidation liquid.

30. A method of manufacturing a diamond sintered body for tools in accordance with claim 2, said method comprising the steps of:

(a) preparing mixed powder of diamond powder larger than 3 μm in particle size, superfine diamond powder smaller than 1 μm in particle size, a carbide smaller than 1 μm selected from groups IVa, Va and VIa of the periodic table and an iron group metal;

(b) graphitizing a part of the powder material at a temperature over 1300° C.;

(c) performing a hot press operation utilizing a super-high pressure/temperature apparatus under a high temperature and a high pressure for retaining the diamond stable; and (d) subjecting the sintered body to acid treatment to leach a part of the iron group metal.

31. A method of manufacturing a diamond sintered body for tools in accordance with claim 5, said method comprising the steps of:

(a) preparing mixed power of diamond powder larger than 3 μm in particle size, superfine diamond powder smaller than 1 μm in particle size, a carbide smaller than 1 μm selected from groups IVa, Va and VIa of the periodic table and an iron group metal;

(b) graphitizing a part of the powder material at a temperature over 1300° C.;

(c) performing a hot press operation utilizing a super-high pressure/temperature apparatus under a high temperature and a high pressure for retaining the diamond stable; and (d) subjecting the sintered body to acid treatment to leach a part of the iron group metal.

32. A diamond sintered body for tools, comprising:
self-bonded diamond particles comprising between about 95% and 99% by volume of said diamond sintered body; and
a residue including:
at least one of a metal or a carbide selected from groups IVa, Va and VIa of the periodic table, and an iron group metal between about 0.1 to 3% by volume of said diamond sintered body; and
pores comprising between about 0.5 and 5% by volume of said diamond sintered body.

33. A diamond sintered body for tools in accordance with claim 32, further comprising at least one of boron and a boride comprising between about 0.005 and 0.25% by volume of said diamond sintered body.

* * * * *